United States Patent
Srinivas et al.

(10) Patent No.: US 8,103,310 B1
(45) Date of Patent: Jan. 24, 2012

(54) METHODS AND SYSTEMS FOR USING FEMTOCELLS TO ADDRESS MACRO-NETWORK BACKHAUL CONGESTION

(75) Inventors: Shilpa Kowdley Srinivas, Herndon, VA (US); Anoop K. Goyal, Overland Park, KS (US); Bhagwan Khanka, Lenexa, KS (US); John W. Prock, Peculiar, MO (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 347 days.

(21) Appl. No.: 12/537,740

(22) Filed: Aug. 7, 2009

(51) Int. Cl.
*H04B 1/38* (2006.01)
(52) U.S. Cl. ........................ 455/561; 455/452.2; 370/329
(58) Field of Classification Search .................. 455/450, 455/452.2, 561; 370/329
See application file for complete search history.

(56) References Cited

U.S. PATENT DOCUMENTS

| | | | |
|---|---|---|---|
| 6,175,737 B1 | 1/2001 | Kao | |
| 6,487,423 B1 | 11/2002 | Johansson | |
| 6,701,149 B1 | 3/2004 | Sen et al. | |
| 7,844,273 B2 * | 11/2010 | Scheinert | 455/444 |
| 7,855,977 B2 * | 12/2010 | Morrison et al. | 370/252 |
| 2002/0067707 A1 | 6/2002 | Morales et al. | |
| 2004/0001439 A1 | 1/2004 | Jones | |
| 2004/0204097 A1 | 10/2004 | Scheinert et al. | |
| 2006/0111130 A1 | 5/2006 | Lee et al. | |
| 2006/0203778 A1 | 9/2006 | Han et al. | |
| 2006/0234747 A1 | 10/2006 | Pan | |
| 2006/0258357 A1 | 11/2006 | Bi et al. | |
| 2006/0262851 A1 | 11/2006 | Bakfan et al. | |
| 2007/0208864 A1 | 9/2007 | Flynn et al. | |
| 2007/0286128 A1 | 12/2007 | Bae et al. | |
| 2008/0008093 A1 | 1/2008 | Wang et al. | |
| 2008/0032738 A1 | 2/2008 | Boyer et al. | |
| 2008/0043692 A1 | 2/2008 | Morita | |
| 2008/0242290 A1 | 10/2008 | Bhatia et al. | |
| 2009/0029645 A1 | 1/2009 | Leroudier | |
| 2010/0027521 A1 * | 2/2010 | Huber et al. | 370/338 |
| 2010/0157941 A1 * | 6/2010 | Raghothaman et al. | 370/331 |
| 2010/0278141 A1 * | 11/2010 | Choi-Grogan et al. | 370/331 |

OTHER PUBLICATIONS

Final Office Action from U.S. Appl. No. 11/874,846, mailed Dec. 17, 2010.
Notice of Allowance from U.S. Appl. No. 11/874,846, mailed Mar. 31, 2011.
Non-final Office Action from U.S. Appl. No. 11/283,565, mailed Apr. 19, 2010.
Notice of Allowance from U.S. Appl. No. 11/283,565, mailed Sep. 20, 2010.
Non-final Office Action from U.S. Appl. No. 11/874,846, mailed Jul. 9, 2010.

(Continued)

*Primary Examiner* — Nhan Le

(57) ABSTRACT

Methods and systems are provided for using femtocells to address macro-network backhaul congestion. In an embodiment, a macro base transceiver station (BTS) that has a backhaul connection to a radio network controller (RNC) detects that a current utilization of the backhaul exceeds a backhaul-congestion threshold, and responsively identifies one or more sector-carriers having a respective current air-interface utilization that is less than a respective sector-carrier-congestion threshold for the respective sector-carrier. The macro BTS further identifies one or more femtocells that are positioned in the coverage area of the one or more identified sector-carriers, and offloads some reverse-link traffic to each identified femtocell over the forward link of an identified sector-carrier in whose coverage area the respective identified femtocell is positioned, for forwarding of the offloaded traffic by the one or more identified femtocells over a packet-data network to an intended destination.

25 Claims, 5 Drawing Sheets

OTHER PUBLICATIONS

Non-final Office Action from U.S. Appl. No. 11/283,565, mailed Feb. 22, 2008.

Final Office Action from U.S. Appl. No. 11/283,565, mailed Aug. 5, 2008.

Non-final Office Action from U.S. Appl. No. 11/283,565, mailed Dec. 16, 2008.

Final Office Action from U.S. Appl. No. 11/283,565, mailed May 27, 2009.

Bennet Wong, "Filing the Generation Gap with Software-Defined, Broadband Radio", CTI Where Datacom Meets Telecom, vol. 4, No. 9, uncovered at least as early as Jul. 2002.

"AirSite Backhaul Free Base Station", AirNet Communications Corporation, http://www.aircom.com/pr_airsite.htm, printed from the World Wide Web on Jun. 28, 2002.

Bennet Wong, "Eliminate the Backhaul Link", AirNet Communications Corporation, http://www.aircom.com/pn_feature.htm, printed from the World Wide Web on Jul. 1, 2002.

Bhanu Srinivas Valluri, "Spectral Efficient Technologies in 3G for Packet Access", http://www.techonline.com/community/ed_resource/feature_article/..., TechOnLine Publication Date Apr. 20, 2005.

Unpublished U.S. Appl. No. 11/283,565, filed Nov. 18, 2005 entitled "Method and System for Wireless Backhaul Communication Between a Radio Access Network and a Remote Base Station".

Unpublished U.S. Appl. No. 11/874,846, filed Oct. 18, 2007 entitled "Alternate Operational-Data Transmission Scheme for Low-Cost-Internet-Base-Station-(LCIB) Systems".

* cited by examiner

METHODS AND SYSTEMS FOR USING FEMTOCELLS TO ADDRESS MACRO-NETWORK BACKHAUL CONGESTION

BACKGROUND

1. Macro Cellular Wireless Networks

Many people use mobile stations, such as cell phones and personal digital assistants (PDAs), to communicate with macro cellular wireless networks (i.e. wireless wide area networks (WWANs)), which typically provide communication services such as voice, text messaging, and packet-data communication. These mobile stations and networks typically communicate with each other over a radio frequency (RF) air interface according to a wireless protocol. Mobile stations typically conduct wireless communications with these networks via one or more base transceiver stations (BTSs), each of which are arranged to send communications to and receive communications from mobile stations over the air interface.

Each BTS is in turn connected with a network entity known as a base station controller (BSC) (also known as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC or RNC, and a switch or gateway such as an MSC and/or PDSN.

The base stations (i.e. BTSs or combinations of (1) one or more BTSs and (2) a BSC or RNC) for these macro cellular networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as macro (or macro-network) base stations, and the network they collectively form—or to which they collectively belong—is referred to generally and herein as the macro network. And the BTSs associated with macro networks may be referred to herein as macro BTSs (or just BTSs).

Mobile stations and macro base stations conduct communication sessions (e.g. voice calls and data sessions) over frequencies known as carriers (i.e. macro carriers), each of which may actually be a pair of frequencies, with the base station transmitting to the mobile station on one of the frequencies, and the mobile station transmitting to the base station on the other. This approach is known as frequency division duplex (FDD). And the base-station-to-mobile-station link is known as the forward link, while the mobile-station-to-base-station link is known as the reverse link. Note that an instance of a carrier in a macro coverage area referred to as a sector may be known and referred to herein as a sector-carrier or macro sector-carrier.

2. Femtocells

Many macro-network subscribers, including private consumers and small businesses, among others, in addition to having wireless service (which may include data service) for their respective mobile stations, also have high-speed (a.k.a. broadband) Internet access through another communication channel, which may be cable-modem service, digital-subscriber-line (DSL) service, satellite-based Internet service, and/or some other option or combination thereof.

In one arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a wireless packet-data interface to, e.g., laptop computers, digital video recorders (DVRs), appliances, and/or any other computing devices or their respective wireless network adapters.

To address gaps in macro-network coverage (e.g. in buildings) and for other reasons, macro-network service providers offer consumers devices referred to herein as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). Note that the aforementioned terms that end in "cell" may also be used generally and herein to refer to the coverage area provided by the respective device. And with respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or WiFi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

A typical femtocell also has a wireless-communication interface (operating according to, e.g., CDMA (Code Division Multiple Access), EV-DO (Evolution Data Optimized), and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. CDMA and EV-DO) are supported), and transmits what is known as and referred to herein as a pilot beacon, which is a radio beacon that includes administrative messages and parameters that mobile stations use to connect with (i.e. handoff to) the femtocell.

A femtocell typically emits the pilot beacon on one or more macro carriers on which service is provided by the surrounding macro network. If service is provided by the surrounding macro network on only one macro carrier, the femtocell will emit its pilot beacon on that macro carrier. If, as is often the case, service is provided by the surrounding macro network on multiple macro carriers, the femtocell may sequentially step through emitting its pilot beacon on some number of those carriers; that is, the femtocell's pilot beacon may "hop"

on a fixed number of macro carriers, and in that scenario is referred to as a frequency-hopping pilot beacon.

And femtocells typically include a Global Positioning System (GPS) receiver for use in receiving and decoding GPS signals, for use in determination of location, as well as for use in synchronizing operations with other femtocells and/or the macro network, based on timing information embedded in GPS signals. Typically, femtocells have fairly comprehensive auto-configuration capabilities, such that they are largely "plug-and-play" to the user.

Overview

As referenced above, one wireless-communication protocol that may be used in a given network is known as EV-DO. Networks that operate according to EV-DO may conform to one or both of industry specifications IS-856, Release 0 and IS-856, Revision A, both of which are hereby incorporated by reference. Note that description of embodiments using EV-DO as the wireless protocol are for illustration only, and that any one or more other protocols could be used instead or in addition. When discussing EV-DO networks, BSCs are typically referred to as RNCs, mobile stations are typically referred to as access terminals, and a combination of an RNC and one or more BTSs may be referred to as an access node. These terms will be used in the balance of this written description, again for illustration and not limitation.

In a typical arrangement, a macro BTS will be communicatively connected to an RNC by a communication link known as and referred to herein as a backhaul, which may take the form of a T1 line or other wired or wireless communication link. Thus, every sector-carrier provided by the macro BTS will share the same backhaul to the RNC. Since a typical BTS provides service in three distinct sectors, this could mean that, for example, 3-6 (or perhaps more) sector-carriers would all share that same backhaul for communication to the RNC. If a T1 line is used as the backhaul, the maximum bandwidth provided on that backhaul is typically on the order of 1.54 Megabits per second (Mbps).

Given that each EV-DO sector-carrier typically has a maximum bandwidth on the order of 3.2 Mbps, it is not unusual for the backhaul for a given macro BTS to be at or near capacity while one or more sector-carriers are not near capacity. Thus, even when backhaul utilization has reached a backhaul-congestion threshold, one or more access terminals may still be transmitting data on the reverse link on a sector-carrier that has not reached a sector-carrier-congestion threshold for that sector-carrier (and on which RF conditions are favorable for such transmission), which exacerbates the congestion problem already present on the backhaul.

This exacerbation may take the form of the backhaul experiencing increased buffering, increased rate of packet erasures, further congestion, and/or one or more other issues. This will decrease the throughput perceived by one or more access-terminal users, which would typically be all the more frustrating in a situation where the RF portion of the communication path is giving no indication of any problem (e.g. the user may perceive "full bars" and still poor throughput). And though current implementations may prioritize latency-sensitive traffic (such as voice) over latency-tolerant traffic (such as "best efforts" traffic (e.g. web browsing)), the average throughput of the latency-sensitive traffic may still be negatively impacted, and the average throughput of the latency-tolerant traffic may be dramatically affected.

As referenced above, macro-network service providers have deployed, and continue to deploy, numerous femtocells; whose respective coverage areas very frequently—in fact almost universally—overlap that of one or more macro-network coverage areas (e.g. sectors provided by macro base stations). The present methods and systems take advantage of this arrangement by offloading some reverse-link traffic that would normally be sent along the backhaul from the macro BTS to the RNC on the forward link to one or more femtocells, which in turn transmit the offloaded traffic along their Internet connection to the macro network, where the traffic can then be routed to its intended destination. Since femtocells use the Internet as their backhaul to the macro network, they are not limited to a finite amount of bandwidth like the macro-BTS backhaul. Furthermore, femtocells are equipped with the ability to tune their receivers to the frequencies of macro sector-carriers for receipt of such offloaded traffic.

Thus, in operation, a macro BTS may detect, perhaps by periodic comparison, that its backhaul utilization is greater than a backhaul-congestion threshold, which may be configurable by network administrators, and may correspond to some fractional part or percentage (e.g. 90%) of the theoretical capacity of the backhaul. Responsive to this determination, the macro BTS determines whether one or more of its sector-carriers (i.e. the sector-carrier(s) on which the BTS is currently providing service) has a current air-interface utilization that is less than a sector-carrier-congestion threshold (e.g. 75%) for that respective sector-carrier. Each sector-carrier may have its own threshold, and each may be configurable by network administrators; however, for simplicity of explanation, the balance of this description assumes that the macro BTS uses the same threshold for each of its sector-carriers.

If the macro BTS identifies one or more of its sector-carriers as having a current air-interface utilization that is less than the sector-carrier-congestion threshold, the macro BTS responsively then identifies a set of one or more femtocells that are positioned in the coverage area(s) of the one or more identified sector-carriers, and directs (by, e.g., sending an instruction message over the air interface or over the Internet) each femtocell in the identified set to tune their respective receivers to a macro-network carrier frequency (i.e. a sector-carrier on which the macro BTS is arranged to be able to transmit data). Note that the macro BTS could direct different femtocells to tune to different macro carriers. The macro BTS further directs (either in the same instruction message or in one or more others) each femtocell in the identified set to forward all data (or all data marked with a particular code or identifier, etc.)—received from the macro BTS on the macro carrier—over the Internet to one or more macro-network entities, which then direct the data to its intended destination(s).

In an embodiment, the macro BTS still sends all traffic deemed to be latency-sensitive traffic from all of its sector-carriers to the RNC over its backhaul connection. In an embodiment, the macro BTS still sends to the RNC over its backhaul connection all traffic—latency-sensitive or otherwise—received on sector-carriers having a current air-interface utilization that exceeds the sector-carrier-congestion threshold. In an embodiment, the macro BTS sends all traffic that is both (1) latency-tolerant and (2) received on sector-carriers that do not exceed the sector-carrier-congestion threshold over the forward link of the air interface to one or more femtocells in the identified set, for conveyance of the traffic in turn by those one or more femtocells over the Internet to the one or more macro-network entities (e.g. using a respective VPN connection for each femtocell), which then direct the traffic to its intended destination(s). And other arrangements are possible as well.

One type of latency-tolerant traffic that may be particularly suited for transmission by the macro BTS to its intended destination via the forward link of the air interface, one or more femtocells, the Internet, and one or more macro-network entities, thereby bypassing the backhaul between the macro BTS and the RNC, is traffic that is latency-tolerant and also error-intolerant. Examples of this type of traffic are web browsing, e-mail, file transfer, news groups, SMS, etc. Basically, any traffic that can tolerate some delay but that is transmitted according to a protocol that calls for retransmission upon error detection would be a good candidate, since the process of retransmission would result in the data ultimately being transmitted correctly, and the removal of repeated retransmissions from the macro BTS backhaul connection would greatly benefit the throughput experienced on that communication link.

Furthermore, it should be noted that any number of sector-carriers, any number of femtocells, any number of access terminals, and any number of any other described components may be involved in particular implementations and in particular instances; however, for clarity of presentation, examples involving a single RNC, a single backhaul, a single macro BTS that provides coverage on one sector-carrier in each of three sectors (for a total of three sector-carriers), one femtocell, and one access terminal may be described herein. This is by way of illustration and not limitation: as stated, any number of any of these entities could be involved.

In an embodiment, a femtocell could be selected based on that femtocell requesting a relatively high forward-link data rate in the EV-DO DRC (Data Rate Control) channel, indicating that the femtocell is experiencing favorable RF conditions. In an embodiment, a femtocell may be selected on the basis that it is not currently bearing a significant amount—or perhaps any—traffic. In an embodiment, a femtocell may be selected and used for backhaul-bypass purposes only until the femtocell begins serving an access terminal directly, at which point the macro BTS may cease using the femtocell for backhaul-bypass purposes. In an embodiment, the degree of RF utilization on a sector-carrier may be monitored while a femtocell is being used for backhaul-bypass purposes; if a certain threshold (which may be the same as or different than the sector-carrier-congestion threshold), the use of that femtocell for backhaul-bypass purposes may be stopped. And any combination of these possibilities may be implemented as well.

It should be noted as well that the macro-BTS backhaul can be bypassed according to a similar though converse approach for data that is transmitted from other entities to the RNC, where that data would normally be routed over the backhaul to the macro BTS for delivery to one or more access terminals over the forward link. Instead, some such traffic could be routed from one or more macro-network entities, over the Internet (perhaps a VPN connection) to one or more femtocells situated in the coverage area(s) of one or more sector-carriers that currently have an air-interface utilization that is less than the sector-carrier-congestion threshold, and then wirelessly transmitted by those one or more femtocells over the air interface to the macro BTS, which will in turn transmit that traffic over the forward link to the intended access terminal(s).

And it should be noted that the above overview is illustrative and not limiting. That is, additional and/or different features may be present in some embodiments. It should be noted as well that any description of a mobile station, a femtocell, and/or a macro network operating according to any particular protocol such as EV-DO is by way of example, and that any suitable protocol(s) may be used instead, such as 1xRTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture a. An Exemplary Communication System

Figure 1A:
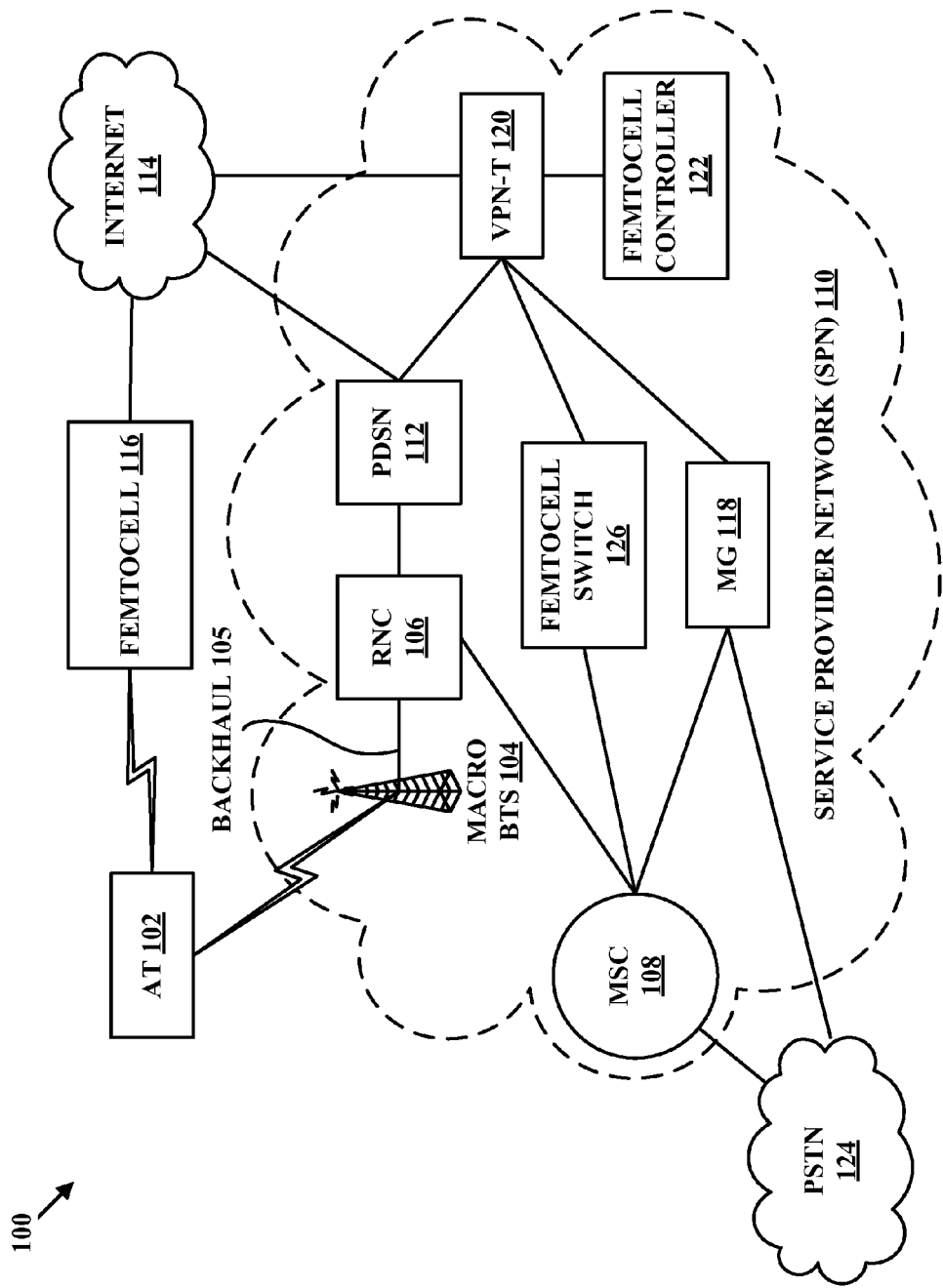
FIG. 1A depicts a communication system, in accordance with exemplary embodiments.

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes an access terminal (AT) 102, a macro BTS 104, an RNC 106, an MSC 108, a service provider network (SPN) 110, a PDSN 112, an Internet 114, a femtocell 116, a media gateway 118, a VPN terminator (VPN-T) 120, a femtocell controller 122, a PSTN 124, and a femtocell switch 126. And additional entities could be present as well, such as additional access terminals in communication with macro BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between Internet 114 and femtocell 116.

Access terminal 102 may be any mobile device arranged to carry out the access-terminal functions described herein. Access terminal 102 may include a user interface, a wireless-communication interface, a processor, and data storage comprising instructions executable by the processor for carrying out those access-terminal functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more femtocells over suitable air interfaces. The chipset could be suitable for EV-DO communication. The chipset or wireless-communication interface in general may also or instead be able to communicate with other types of networks and devices, such as 1xRTT CDMA networks, Wi-Fi networks, Bluetooth devices, and/or one or more additional types of networks and devices. The processor and data storage may be any suitable components known to those of skill in the art. As examples, access terminal 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more (e.g. EV-DO) coverage areas such as cells and sectors, for communicating with access terminals such as access terminal 102 over an air interface. The communication interface may also include one or more wired (e.g. Ethernet) and/or wireless (e.g. WiFi) interfaces for communicating with at least RNC 106.

RNC 106 may be any network element arranged to carry out the RNC functions described herein, and may include a communication interface, a processor, and data storage comprising instructions executable by the processor to carry out those RNC functions. The communication interface may include one or more wired and/or wireless interfaces for communicating with at least macro BTS 104, MSC 108, and PDSN 112. In general, RNC 106 functions to control one or more macro BTSs such as macro BTS 104, and to provide those one or more macro BTSs with connections to devices such as MSC 108 and PDSN 112.

Note that the combination of macro BTS 104 and RNC 106 may be considered a macro base station. However, macro BTS 104 or RNC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein, and may include a communication interface, a processor, and data storage comprising instructions executable by the processor to carry out those MSC functions. The communication interface may include one or more wired and/or wireless interfaces for communicating with at least RNC 106, MG 118, femtocell switch 126, and PSTN 124. In general, MSC 108 acts as a switch between (a) PSTN 124 and (b) (i) one or more RNCs such as RNC 106 and (ii) one or more femtocell switches such as femtocell switch 126, facilitating communication between access terminals and PSTN 124, which may be the public switched telephone network.

Service-provider network 110 may encompass all of the network elements depicted in FIG. 1A as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein, and may include a communication interface, a processor, and data storage comprising instructions executable by the processor for carrying out those PDSN functions. The communication interface may include one or more wired and/or wireless interfaces for communicating with at least RNC 106, VPN terminator 120, and Internet 114. In general, PDSN 112 acts as a network access server between (a) Internet 114 and (b) (i) RNCs such as RNC 106 and (ii) VPN terminators such as VPN terminator 120, facilitating packet-data communication between access terminals and Internet 114, via macro base stations and femtocells.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

Femtocell 116 may be any computing and communication device arranged to carry out the femtocell functions described herein, and may include a communication interface, a processor, and data storage comprising instructions executable by the processor for carrying out those femtocell functions. The communication interface may include (a) a wireless interface for communicating with one or more access terminals according to a protocol such as EV-DO (and/or one or more other protocols) and (b) an Ethernet or WiFi interface for communicating with a device such as a router and/or a cable modem. Femtocell 116 may also have a GPS receiver and/or other location module, and is also described in connection with FIG. 2.

Figure 1B:
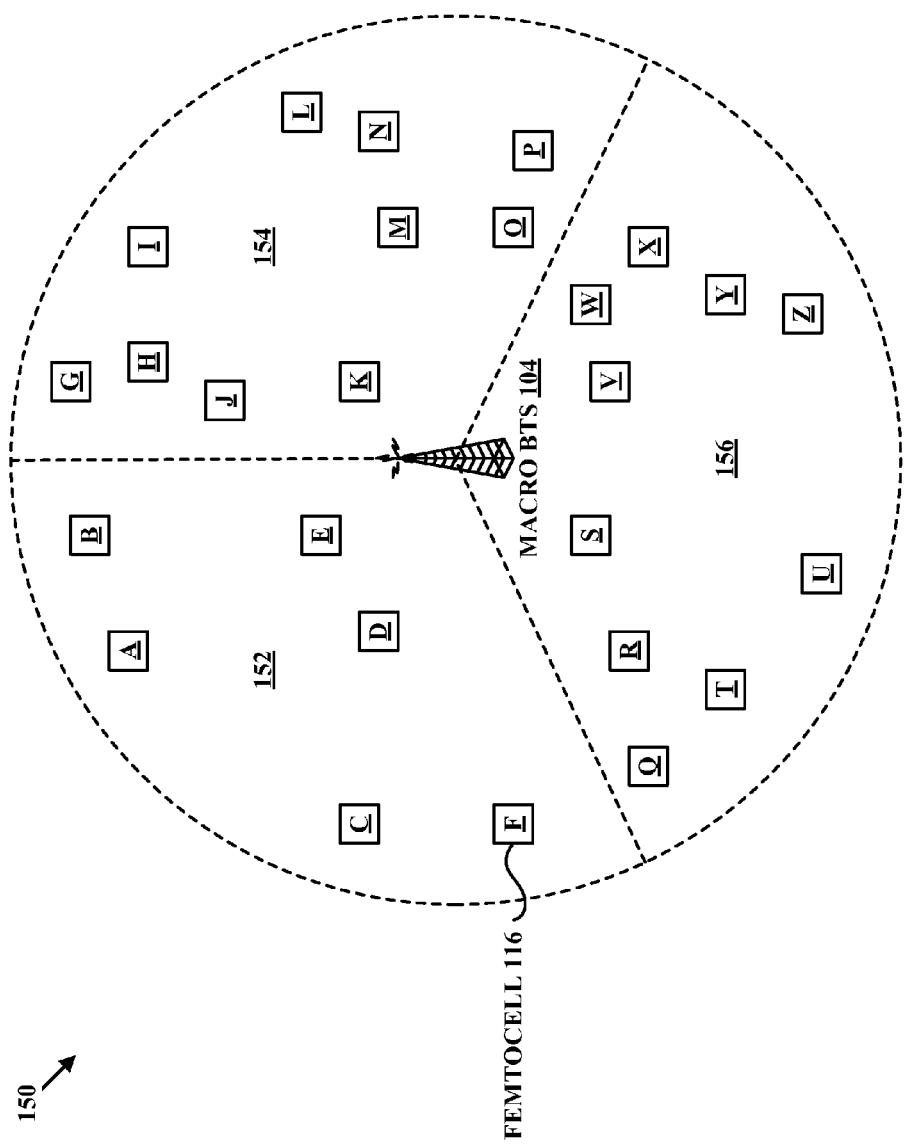
FIG. 1B depicts multiple sectors provided by a macro base transceiver station (BTS), as well as exemplary locations of multiple femtocells, in accordance with exemplary embodiments.

In general, as depicted in FIG. 1B, a service provider may deploy numerous femtocells, all or almost all of which will be located within at least one macro-network coverage area, such as a sector. FIG. 1B depicts a coverage area 150—of macro BTS 104—divided into three sectors 152, 154, and 156. Note that macro BTS 104 may provide service on one or more macro carriers in each of sectors 152, 154, and 156; however, for simplicity, the examples in the description of the figures involve only one sector-carrier per sector; thus, this description also refers to sector-carriers 152, 154, and 156. FIG. 1B also depicts femtocells A-F located in the coverage area of sector-carrier 152, femtocells G-P located in the coverage area of sector-carrier 154, and femtocells Q-Z located in the coverage area of sector-carrier 156. This is an example, as any macro sector or other coverage area may have between zero and any positive number of femtocells located therein. In the example of FIG. 1B, femtocell F is shown as being femtocell 116 of FIGS. 1A and 2, though this is of course arbitrarily selected by way of example.

In general, the macro network (i.e. the macro-network service provider by way of one or more macro-network entities such as MSC 108, femtocell controller 122, and/or femtocell switch 126) may maintain data reflecting various attributes of these various femtocells, such as location, identification of in which macro sector if any they are located, PN offset used for pilot-beacon transmission, traffic-bearing carrier and PN offset, transmission power, and/or any other suitable descriptors, operating-parameter values, characteristics, etc.

Returning to FIG. 1A, media gateway (MG) 118 may be any networking element arranged to carry out the media-gateway functions described herein, and may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, femtocell controller 122, femtocell switch 126, and Internet 114. In general, VPN terminator 120 functions to establish secure VPN connections over Internet 114 with femtocells such as femtocell 116, enabling the femtocells to securely communicate with devices on SPN 110 and perhaps beyond.

Femtocell controller 122 may be any networking element arranged to carry out the femtocell-controller functions described herein, and may include a communication interface, a processor, and data storage comprising instructions executable by the processor for carrying out those femtocell-controller functions. The communication interface may include one or more wired and/or wireless interfaces for communicating with at least VPN terminator 120, along with perhaps one or more other entities on SPN 110, and beyond.

Among other functions, femtocell controller 122 communicates via VPN terminator 120 with femtocells such as femtocell 116, and may receive requests from various femtocells for configuration data, and those requests may include, among other values, indications of the femtocells' respective locations. Femtocell controller 122 may also be operable to select various operational parameters for femtocells (e.g. carrier, PN offset, whether to broadcast a pilot-beacon, contents of any pilot beacons to be broadcast, transmission-power level), and to transmit those parameters to femtocells, perhaps along with other configuration data and messaging.

Femtocell switch 126 may be any networking element arranged to carry out the femtocell-switch functions described herein, and may include a communication interface, a processor, and data storage comprising instructions executable by the processor for carrying out those femtocell-switch functions. The communication interface may include one or more wired and/or wireless interfaces for communicating with at least MSC 108 and VPN terminator 120. In general, femtocell switch 126 acts as a switch between MSC 108 and VPN terminator 120, enabling access terminals to communicate via femtocells over PSTN 124 via MSC 108.

b. An Exemplary Femtocell

Figure 2:
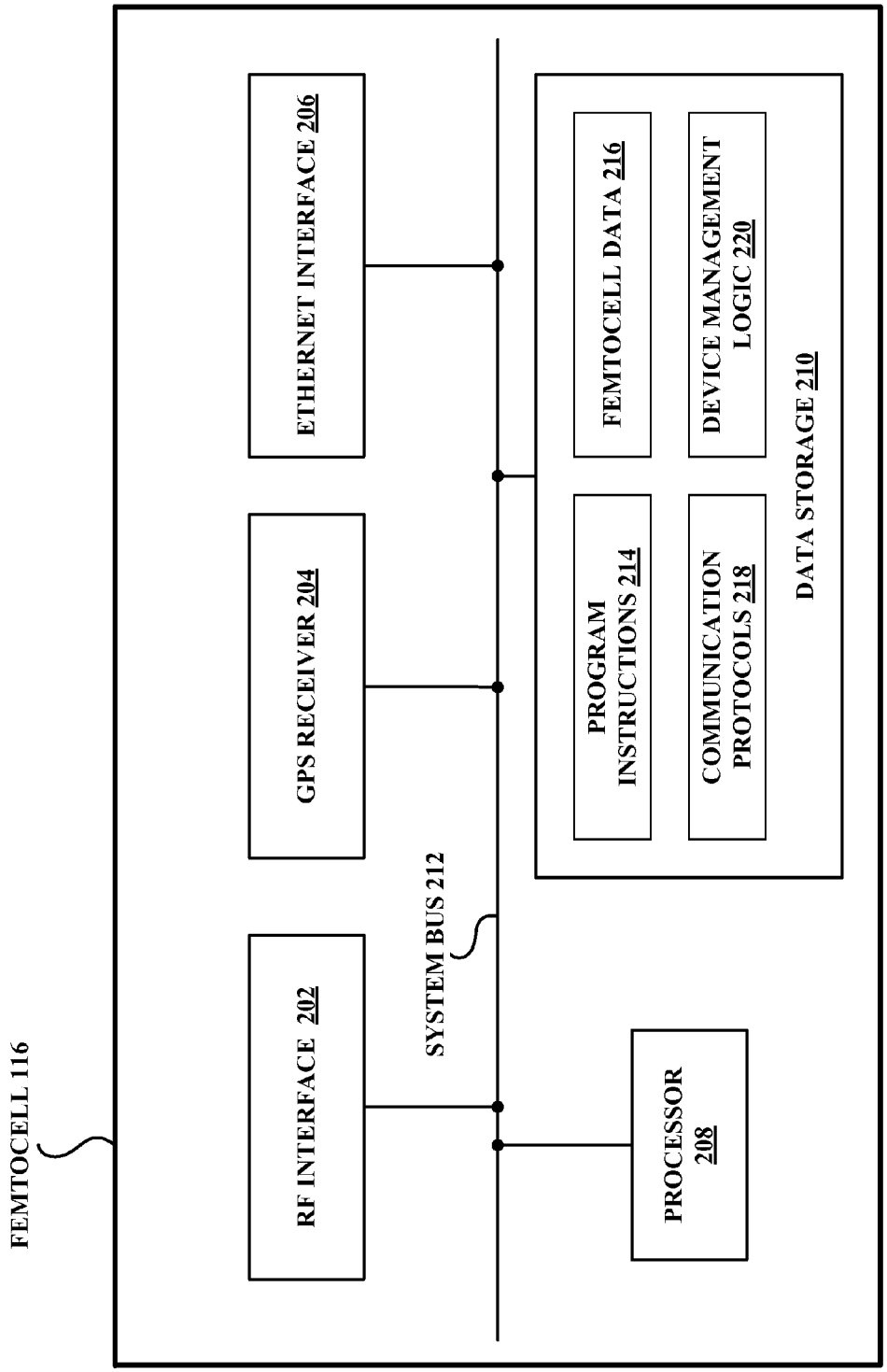
FIG. 2 depicts a femtocell, in accordance with exemplary embodiments.

FIG. 2 depicts an exemplary diagram of femtocell 116, which includes an RF interface 202, a GPS receiver 204, an Ethernet interface 206, a processor 208, and data storage 210, all communicatively linked by a system bus 212. Note that femtocell 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as EV-DO (and/or one or more other protocols). GPS receiver 204 may be any known or hereafter-developed GPS receiver, suitable for receiving and decoding GPS signals for location and timing purposes, perhaps among other purposes. In some embodiments, a femtocell may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable medium, and may contain (a) program instructions 214 executable by processor 208 for carrying out the femtocell functions described herein, (b) femtocell data 216, which may be any operational or other data stored for use by femtocell 116, (c) communication protocols 218, facilitating and enabling communication with one or more other devices, and (d) device management logic 220, perhaps for memory and file management.

2. Exemplary Operation a. A First Exemplary Method

Figure 3:
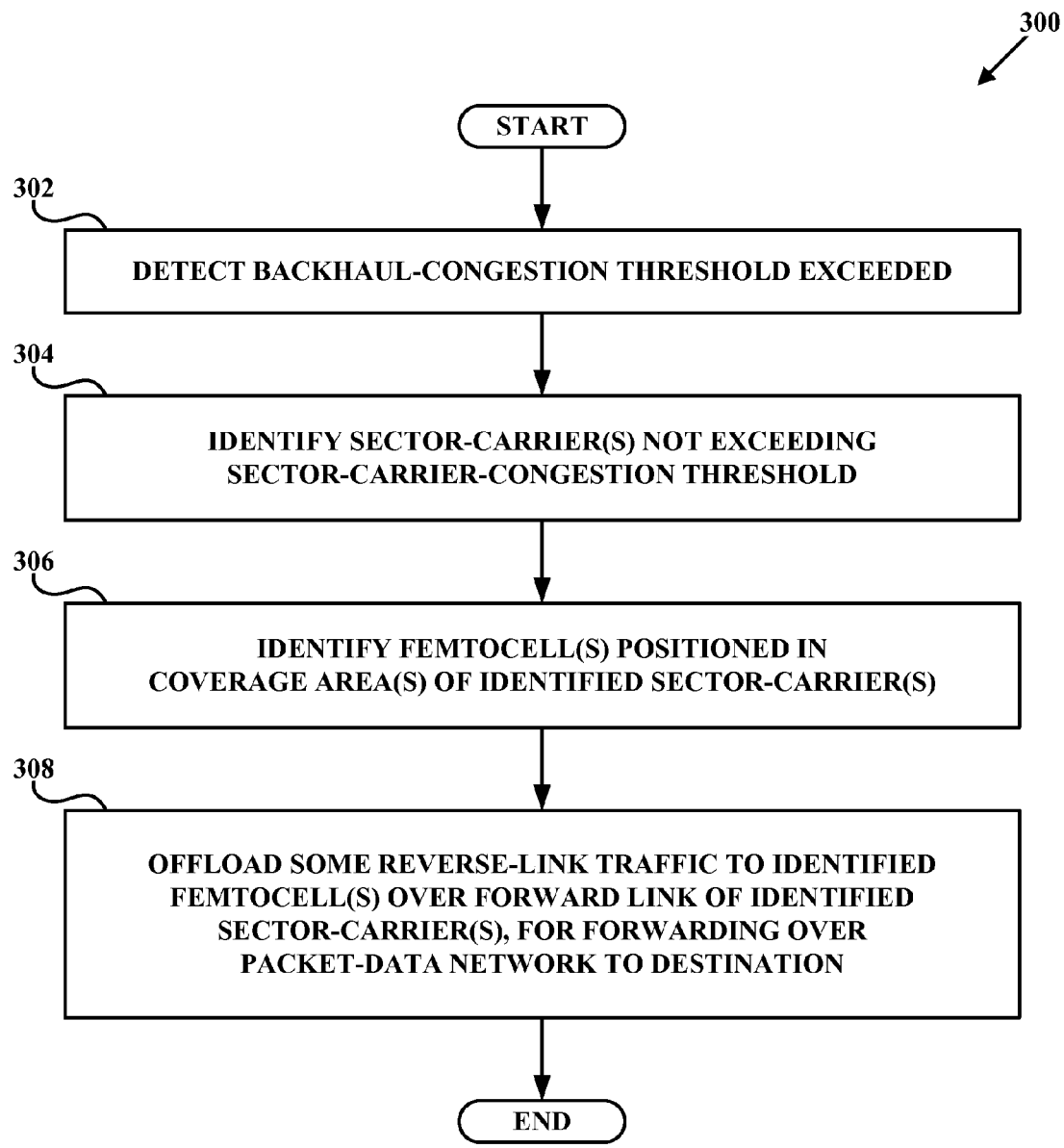
FIG. 3 depicts a method, in accordance with exemplary embodiments.

FIG. 3 depicts a method 300, which may be carried out by a macro BTS such as macro BTS 104, or may be carried out by macro BTS 104 in cooperation with one or more other entities. In general, method 300 could be carried out by any one or any combination of the network elements described herein, or any other network element(s). As described above, macro BTS 104 has backhaul connection 105 (which may be a T1 line) to RNC 106. Furthermore, macro BTS 104 provides service to access terminals on a plurality of sector-carriers, each having a respective coverage area. The service may be or include EV-DO service in compliance with at least one of IS-856, Release 0 and IS-856, Revision A. As also described above, macro BTS 104 may provide service in a plurality of sectors, each associated with at least one sector-carrier.

As shown in FIG. 3, method 300 begins at step 302, when macro BTS 104 detects that a current utilization of the backhaul connection 105 exceeds a backhaul-congestion threshold, which may be 90% or thereabouts, and may be configurable by network administrators. In some embodiments, macro BTS 104 may periodically compare the current utilization of the backhaul connection 105 to the backhaul-congestion threshold. Macro BTS 104 may itself measure the current utilization; also or instead, macro BTS 104 may receive reports of the current utilization of the backhaul from an entity such as RNC 106, or perhaps a monitoring entity in between macro BTS 104 and RNC 106. And certainly other arrangements are possible as well.

At step 304, responsive to detecting that the current utilization of the backhaul connection exceeds the backhaul-congestion threshold, macro BTS 104 identifies one or more of the sector-carriers on which it provides service having a respective current air-interface utilization that is less than a respective sector-carrier-congestion threshold for the respective sector-carrier. In some embodiments, at least one sector-carrier-congestion threshold may be about 75%. Note that the same sector-carrier-congestion threshold could be used for every sector-carrier in the plurality; though different thresholds for different sector-carriers could just as well be used. Macro BTS 104 may measure the amount of data being received on, for example, a per-second basis, and compare that measured amount with a sector-carrier-congestion threshold.

At step 306, macro BTS 104 identifies one or more femtocells that are positioned in the coverage area of the one or more sector-carriers that were identified in step 304 as having a respective current air-interface utilization that is less than a respective sector-carrier-congestion threshold for the respective sector-carrier. Each identified femtocell may comprise a respective receiver, and method 300 may comprise macro BTS 104 directing each identified femtocell to tune its respective receiver to an identified sector-carrier in whose coverage area the respective identified femtocell is positioned.

In some embodiments, identifying one or more femtocells that are positioned in the coverage area of the one or more identified sector-carriers may involve identifying one or more femtocells that are both (1) positioned in the coverage area of the one or more identified sector-carriers and (2) requesting a forward-link data rate that exceeds a data-rate threshold. In some embodiments, identifying one or more femtocells that are positioned in the coverage area of the one or more identified sector-carriers may involve identifying one or more femtocells that are both (1) positioned in the coverage area of the one or more identified sector-carriers and (2) currently bearing an amount of data that is less than a data-bearing threshold. And certainly other possibilities exist as well.

At step 308, macro BTS 104 offloads some reverse-link traffic to each femtocell (identified in step 306) over a forward link of a sector-carrier (identified in step 304) in whose coverage area the respective identified femtocell is positioned, for forwarding of the offloaded traffic by the one or more identified femtocells over a packet-data network (such as or including the Internet) to an intended destination of the offloaded traffic. In some embodiments, macro BTS 104 may direct each identified femtocell to forward offloaded traffic over the packet-data network to the intended destination of the offloaded traffic. The one or more identified femtocells may then forward the offloaded traffic over the packet-data network to the intended destination, perhaps via one or more intermediate network entities.

In some embodiments and/or instances, macro BTS 104 offloads traffic to exactly one femtocell. In other embodiments and/or instances, macro BTS 104 offloads traffic to multiple femtocells. In some embodiments, the offloaded traffic does not include latency-sensitive traffic; rather, macro BTS 104 sends such traffic from all sector-carriers on which it provides service to RNC 106 over backhaul connection 105. In some embodiments, the offloaded traffic does not include traffic received on sector-carriers having a respective current air-interface utilization that is greater than a sector-carrier-congestion threshold for the sector-carrier; rather, macro BTS 104 sends such traffic to RNC 106 over backhaul connection 105.

In some embodiments, the offloaded traffic includes traffic that is (1) latency-tolerant and (2) received on sector-carriers having a respective current air-interface utilization that is less than a respective sector-carrier-congestion threshold for the respective sector-carrier; in other embodiments, this is the only type of traffic that is offloaded to one or more femtocells. In some embodiments, the offloaded traffic includes traffic that is latency-tolerant and error-intolerant; in other embodiments, this is the only type of traffic that is offloaded to one or more femtocells. In some embodiments, macro BTS 104 may cease the use of a given femtocell for offloading of traffic in response to determining that the femtocell has begun serving an access terminal.

b. A Second Exemplary Method

Figure 4:
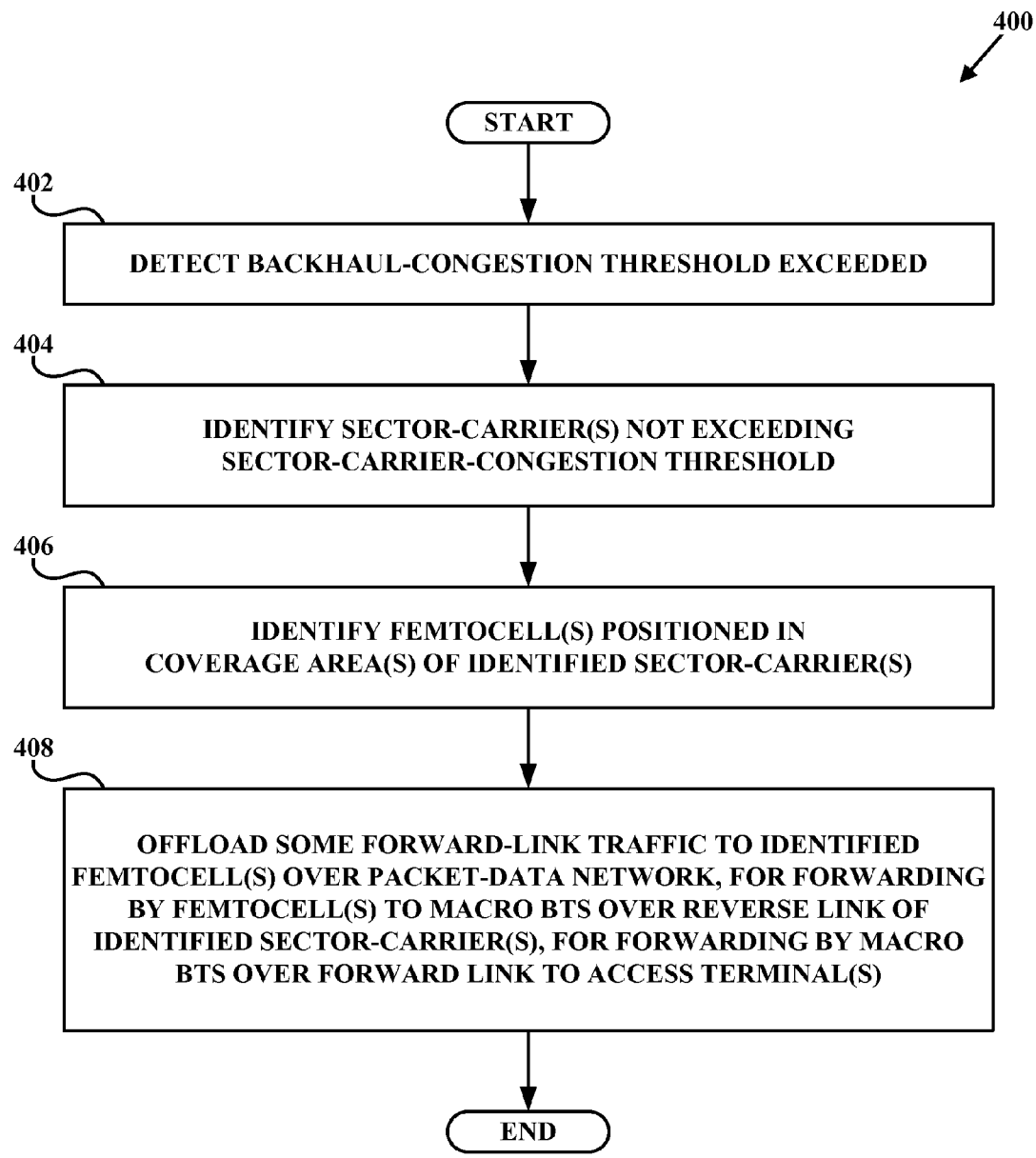
FIG. 4 depicts a method, in accordance with exemplary embodiments.

FIG. 4 depicts a method 400, which may be carried out by an RNC such as RNC 106, perhaps in cooperation with one or more other entities. In general, method 300 could be carried out by any one or any combination of the network elements described herein, or any other network element(s). Method 400 is similar in many ways to method 300, and thus is not described in as great of detail. It is explicitly contemplated that all possibilities and permutations discussed with respect to method 300 could apply equally to method 400. As described above, RNC 106 has a backhaul connection 105 to macro BTS 104, which provides service to access terminals on a plurality of sector-carriers, each having a respective coverage area.

At step 402, RNC 106 detects that a current utilization of the backhaul connection 105 exceeds a backhaul-congestion threshold, which may be 90% or thereabouts, and may be configurable by network administrators. At step 404, responsive to detecting that the current utilization of the backhaul connection exceeds the backhaul-congestion threshold, RNC 106 identifies one or more of the sector-carriers on which macro BTS 104 provides service having a respective current air-interface utilization that is less than a respective sector-carrier-congestion threshold for the respective sector-carrier.

At step 406, RNC 106 identifies one or more femtocells that are positioned in the coverage area of the one or more identified sector-carriers. At step 408, RNC 106 offloads some forward-link traffic to each identified femtocell over a packet-data network, for forwarding of the offloaded traffic by the one or more identified femtocells to macro BTS 104 over a reverse link of an identified sector-carrier in whose coverage area the respective identified femtocell is positioned, for forwarding of the offloaded traffic by macro BTS 104 over a forward link of at least one sector-carrier to one or more access terminals.

CONCLUSION

Various exemplary embodiments have been described above. Those skilled in the art will understand, however, that changes and modifications may be made to those examples without departing from the scope of the claims.

The invention claimed is:

1. A method comprising:
a macro base transceiver station (BTS) that has a backhaul connection to a radio network controller (RNC) and provides service to access terminals on a plurality of sector-carriers, each sector-carrier having a respective coverage area, detecting that a current utilization of the backhaul connection exceeds a backhaul-congestion threshold;
responsive to detecting that the current utilization of the backhaul connection exceeds the backhaul-congestion threshold, the macro BTS identifying one or more of the sector-carriers in the plurality of sector-carriers having a respective current air-interface utilization that is less than a respective sector-carrier-congestion threshold for the respective sector-carrier;

the macro BTS identifying one or more femtocells that are positioned in the coverage area of the one or more identified sector-carriers; and the macro BTS offloading some reverse-link traffic to each identified femtocell over a forward link of an identified sector-carrier in whose coverage area the respective identified femtocell is positioned, for forwarding of the offloaded traffic by the one or more identified femtocells over a packet-data network to an intended destination of the offloaded traffic.

2. The method of claim 1, wherein the backhaul connection comprises a T1 line.

3. The method of claim 1, wherein the service comprises EV-DO (Evolution Data Optimized) service in compliance with at least one of IS-856, Release 0 and IS-856, Revision A.

4. The method of claim 1, wherein the macro BTS provides service in a plurality of sectors, each sector associated with at least one sector-carrier in the plurality of sector-carriers.

5. The method of claim 1, wherein the backhaul-congestion threshold is about 90%.

6. The method of claim 1, wherein at least one sector-carrier-congestion threshold is about 75%.

7. The method of claim 1, wherein the same sector-carrier-congestion threshold is used for every sector-carrier in the plurality.

8. The method of claim 1, wherein the same sector-carrier-congestion threshold is not used for every sector-carrier in the plurality.

9. The method of claim 1, wherein each identified femtocell comprises a respective receiver, the method further comprising the macro BTS directing each identified femtocell to tune its respective receiver to an identified sector-carrier in whose coverage area the respective identified femtocell is positioned.

10. The method of claim 1, further comprising the macro BTS directing each identified femtocell to forward the offloaded traffic over the packet-data network to the intended destination of the offloaded traffic.

11. The method of claim 1, wherein identifying one or more femtocells that are positioned in the coverage area of the one or more identified sector-carriers comprises identifying one or more femtocells that are (1) positioned in the coverage area of the one or more identified sector-carriers and (2) requesting a forward-link data rate that exceeds a forward-link-data-rate threshold.

12. The method of claim 1, wherein identifying one or more femtocells that are positioned in the coverage area of the one or more identified sector-carriers comprises identifying one or more femtocells that are (1) positioned in the coverage area of the one or more identified sector-carriers and (2) currently bearing an amount of data that is less than a data-bearing threshold.

13. The method of claim 1, wherein the macro BTS offloads traffic to exactly one femtocell.

14. The method of claim 1, wherein the macro BTS identifies offloads traffic to multiple femtocells.

15. The method of claim 1, wherein the offloaded traffic does not comprise latency-sensitive traffic, wherein the macro BTS sends latency-sensitive traffic from all sector-carriers in the plurality of sector-carriers to the RNC over the backhaul connection.

16. The method of claim 1, wherein the offloaded traffic does not comprise traffic received on sector-carriers having a respective current air-interface utilization that is greater than a respective sector-carrier-congestion threshold for the respective sector-carrier, wherein the macro BTS sends such traffic to the RNC over the backhaul connection.

17. The method of claim 1, wherein the offloaded traffic comprises traffic that is both (1) latency-tolerant and (2) received on sector-carriers having a respective current air-interface utilization that is less than a respective sector-carrier-congestion threshold for the respective sector-carrier.

18. The method of claim 1, wherein the offloaded traffic consists of traffic that is both (1) latency-tolerant and (2) received on sector-carriers having a respective current air-interface utilization that is less than a respective sector-carrier-congestion threshold for the respective sector-carrier.

19. The method of claim 1, wherein the offloaded traffic comprises traffic that is both latency-tolerant and error-intolerant.

20. The method of claim 1, wherein the offloaded traffic consists of traffic that is both latency-tolerant and error-intolerant.

21. The method of claim 1, wherein the packet-data network comprises the Internet.

22. The method of claim 1, further comprising the one or more identified femtocells forwarding the offloaded traffic over the packet-data network to the intended destination of the offloaded traffic.

23. The method of claim 1, further comprising the macro BTS ceasing the use of a given femtocell for offloading of traffic in response to determining that the given femtocell has begun serving an access terminal.

24. A macro base transceiver station (BTS), wherein the macro BTS provides service on a plurality of sector-carriers, each sector-carrier having a respective coverage area, the macro BTS comprising:
a backhaul connection to a radio network controller (RNC);
a communication interface;
a processor; and
data storage comprising instructions executable by the processor for:
detecting that a current utilization of the backhaul connection exceeds a backhaul-congestion threshold;
responsive to detecting that the current utilization of the backhaul connection exceeds the backhaul-congestion threshold, identifying one or more of the sector-carriers in the plurality of sector-carriers having a respective current air-interface utilization that is less than a respective sector-carrier-congestion threshold for the respective sector-carrier;
identifying one or more femtocells that are positioned in the coverage area of the one or more identified sector-carriers; and
offloading some reverse-link traffic to each identified femtocell over a forward link of an identified sector-carrier in whose coverage area the respective identified femtocell is positioned, for forwarding of the offloaded traffic by the one or more identified femtocells over a packet-data network to an intended destination of the offloaded traffic.

25. A method comprising:
a radio network controller (RNC) that has a backhaul connection to a macro base transceiver station (BTS) that provides service on a plurality of sector-carriers, each sector-carrier having a respective coverage area, detecting that a current utilization of the backhaul connection exceeds a backhaul-congestion threshold;
responsive to detecting that the current utilization of the backhaul connection exceeds the backhaul-congestion threshold, the RNC identifying one or more of the sector-carriers in the plurality of sector-carriers having a respective current air-interface utilization that is less than a respective sector-carrier-congestion threshold for the respective sector-carrier;

the RNC identifying one or more femtocells that are positioned in the coverage area of the one or more identified sector-carriers; and the RNC offloading some forward-link traffic to each identified femtocell over a packet-data network, for forwarding of the offloaded traffic by the one or more identified femtocells to the macro BTS over a reverse link of an identified sector-carrier in whose coverage area the respective identified femtocell is positioned, for forwarding of the offloaded traffic by the macro BTS over a forward link of at least one sector-carrier to one or more access terminals.

\* \* \* \* \*